Jan. 12, 1960  P. T. MITCHELL  2,920,908
MEANS AND METHOD FOR SEALING THE GAP BETWEEN
A PIPE AND THE END OF A SURROUNDING CASING
Filed July 7, 1955  3 Sheets-Sheet 1

PAUL T. MITCHELL
INVENTOR.

BY

ATTORNEY.

PAUL T. MITCHELL
INVENTOR.

BY
ATTORNEY.

Jan. 12, 1960 P. T. MITCHELL 2,920,908
MEANS AND METHOD FOR SEALING THE GAP BETWEEN
A PIPE AND THE END OF A SURROUNDING CASING
Filed July 7, 1955 3 Sheets-Sheet 3

PAUL T. MITCHELL
INVENTOR.

BY

ATTORNEY.

2,920,908
MEANS AND METHOD FOR SEALING THE GAP BETWEEN A PIPE AND THE END OF A SURROUNDING CASING

Paul T. Mitchell, Hawthorne, Calif., assignor to Pipeline Coating & Engineering Co., Inc., Los Angeles, Calif.

Application July 7, 1955, Serial No. 520,402

4 Claims. (Cl. 285—53)

This invention relates to means to protect transmission pipelines that are used for long distance transportation of fluids such as oil or gas, and relates particularly to a means and method for sealing the ends of casings that are placed around short portions of such pipelines for local protection.

There are two major requirements in the installation of a transmission carrier pipe, namely, that the carrier pipe be protected as well as possible against corrosion, and that measures be taken to protect the public from the hazards of such a pipeline. To meet the first requirement the pipeline industry takes advantage of tested advances in anti-corrosion materials, methods and devices. Thus underground pipelines are commonly coated with such materials as asphalt, coal tar, and the like, or are wrapped with various types of protective tapes. In addition, such a pipeline is usually provided with cathodic protection by the application of an electrical potential to reverse the natural direction of current flow between the pipeline itself and the surrounding soil.

With reference to protecting the public against hazards, it is recognized that failure in the pipeline, usually due to corrosion, may occur at any point and that such a failure on the part of a pipeline carrying gas or a volatile liquid may result in the accumulation of a dangerous pocket of gas or vapor. As protection against this possibility, it is standard practice to enclose a pipeline in a protective casing for a desirable distance where the pipeline passes under or is adjacent to a highway or railroad.

The casing surrounds the pipeline approximately concentrically and is sealed at its opposite ends to provide an annular space around the pipeline to confine any gases or vapors that may leak or form in this region. A vent pipe from this sealed annular space extends above ground to bleed off any gases or vapors that may tend to accumulate. Thus the arrangement prevents any hazardous accumulation of explosive fluids immediately under the highway or railroad.

It is readily appreciated that the surrounding casing must be insulated from the carrier pipe to make the cathodic protection of the pipeline effective throughout the length of pipe inside the casing. It is further apparent that each end of the casing must be effectively sealed to keep water or soil from filling the annular space, and thus defeating the purpose of the casing.

The requisites for an ideal seal construction at the end of such a casing are based on the foregoing considerations, along with other considerations that are important in practice. The following requirements are to be borne in mind:

(1) The seal must be fluid tight;

(2) The seal must be a non-conductor to prevent electrical communication between the pipeline and the casing;

(3) The seal must be permanent and not subject to deterioration from any cause;

(4) The seal must be relatively easy to install;

(5) The seal must be of inexpensive construction;

(6) The seal must be capable of withstanding the impact of rocks, dirt clods, and other objects, in the backfilling of a pipeline trench;

(7) The seal should yield to relative longitudinal movements of minor magnitude between the pipeline and the casing without losing its sealing effectiveness;

(8) The seal should yield to relative radial movements between the pipeline and the casing without losing its sealing effectiveness.

The general object of the present invention is to meet these various requirements. For this purpose the invention provides a sleeve of relatively pliable, rubber-like material to bridge and seal the annular gap between the pipeline and the end of the surrounding casing, the sleeve being of a length to permit the sleeve to be tucked into the end of the casing into the annular space between the casing and the carrier pipe to form an outer circumferential fold enclosing the rim of the casing and a second inner circumferential fold in the annular space. This arrangement provides freedom for longitudinal relative movement between the casing and the carrier pipe without interference on the part of the sleeve. One end of the sleeve is of a diameter to embrace the carrier pipe in a sealing manner, and the other end of the sleeve is of a larger diameter to embrace the end of the casing in a sealing manner, an intermediate portion of the sleeve being of an intermediate diameter to permit the sleeve to be tucked into the casing in a manner to form two smooth folds that are substantially uniform around the circumference of the sleeve.

A further feature of the preferred practice of the invention is the concept of providing a pre-formed, impact-resistant, protective shield or shell of reinforced non-conducting plastic material to protect the double-folded sleeve. This shield is sufficiently rigid to maintain its pre-formed configuration under the impact of rocks and under the weight of the overburden or fill, and preferably is of a length to protect the full length of a folded sleeve.

Preferably one end of this shield is anchored relative to one end of the sleeve, the other end of the shield being free for movement, thereby to avoid interference with minor relative movement between the carrier pipe and the casing caused by temperature expansion and contraction. In the preferred practice of the invention the larger end of the shield is fixed relative to the casing, with the smaller end of the shield free to slide relative to the surface of the carrier pipe.

A feature of an alternate practice of the invention is the provision of a longitudinally split sleeve to serve the same purpose and to function in the same manner as the continuous sleeve. The split sleeve has overlapping longitudinal edges which may be cemented together. By virtue of this longitudinal split the sleeve may be opened and moved laterally into engagement with the carrier pipe and casing end, and, therefore, the sleeve may be installed anytime after the carrier pipe and casing are laid. A further advantage of this form of the invention is that the longitudinal edges of the split sleeve may overlap to various degrees in the finished installation, and this fact makes it possible to install a given sleeve on carrier pipes and casings of various diameter, the sleeve being overlapped to the degree required for any particular diameter of carrier pipe and any particular diameter of casing.

The various features and advantages of the invention may be understood from the following detailed description taken with the accompanying drawings.

In the drawings, which are to be regarded as merely illustrative:

Figure 9:
Figure 10:
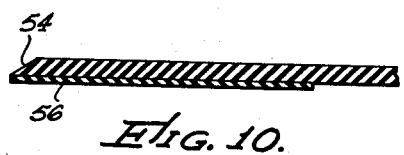
Figure 12:
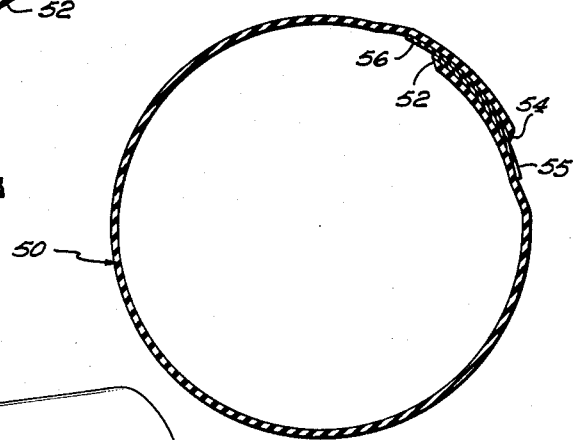
Figure 11:
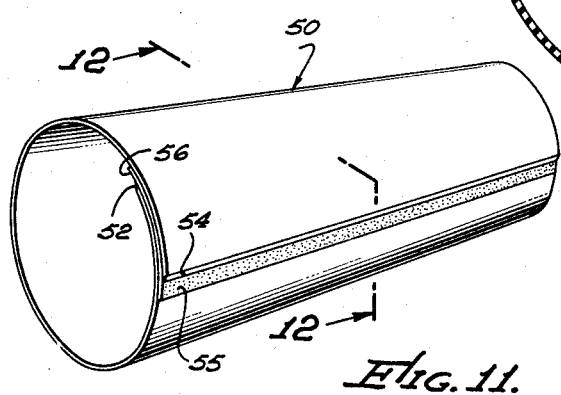

Figs. 9 and 10 are sectional views of the opposite ends of the split sleeve taken as indicated by the lines 9—9 and 10—10 respectively;

Fig. 11 is a perspective view of the sleeve with its overlapping longitudinal edges cemented together; and Fig. 12 is a transverse section of the cemented sleeve shown in Fig. 11.

Figure 1:
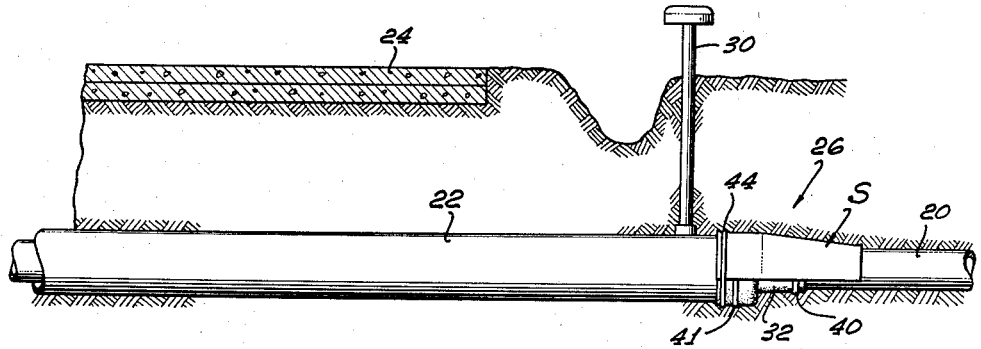
Fig. 1 is a side elevation showing the presently preferred embodiment of the invention sealing the end of a casing.

Fig. 1 shows how a pipeline 20 for transporting oil, gas and the like, is surrounded by casing 22 where the pipeline passes under a roadbed 24. The pipeline 20 is supported substantially concentrically in the casing 22 by means of a plurality of longitudinally spaced insulating spacers (not shown) in a well-known manner. The casing 22 is sealed at each of its opposite ends by a sealing assembly, generally designated by numeral 26, which is the subject of the present invention, thus providing a sealed annular space 28 (Fig. 5) around the portion of the pipeline immediately under the roadbed 24. A suitable vent pipe 30 places this sealed annular space 28 in communication with the atmosphere to one side of the roadbed 24 for release and dissipation of any vapor or gas that may exist in the annular space.

Figure 3:
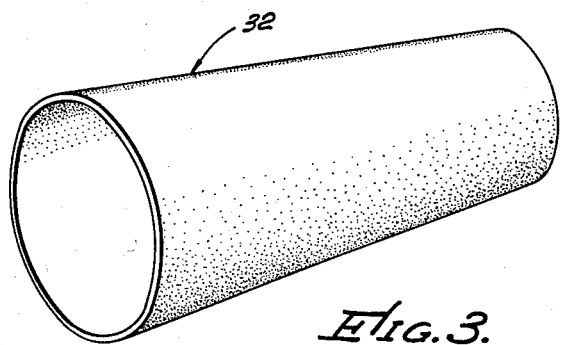
Fig. 3 is a perspective view of the sealing sleeve used in the preferred practice of the invention.
Figure 7:
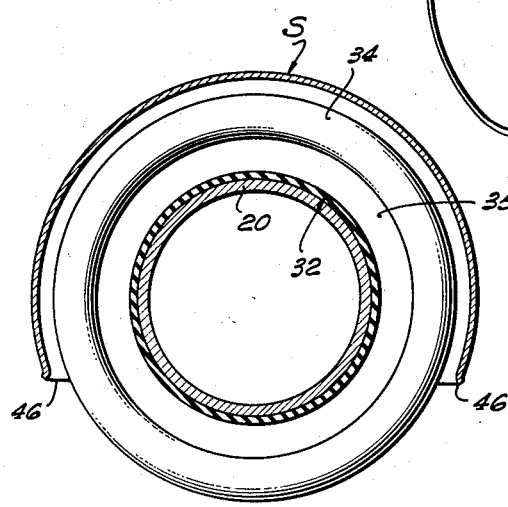
Fig. 7 is a transversed section taken as indicated by the angular line 7—7 of Fig. 6.

The presently preferred practice of the invention provides a sleeve such as the sleeve 32 in Fig. 3 of relatively pliable, rubber-like material of the proper size and shape to bridge and seal the annular gap between the end of the casing 22 and the enclosed carrier pipe 20. The sleeve 32 may be made, for example, of polymerized chlorobutadiene, which is commonly available under the trade name Neoprene. It has been found that what is known as an aircraft quality 100% neoprene of 55 to 65 Duro "A" hardness of a thickness ranging, say, from $\frac{3}{32}$ inch to $\frac{5}{32}$ inch combines the qualities and properties for the purpose of the invention. A sleeve of this material is economical in cost and is exceptionally resistant to cold flow, aging, moisture absorption, aliphatic vapors and liquids, alcohols, most acids within reasonable concentrations, etc. Neoprene has high tensile strength and is both elastic and pliable to the desired extent. Other highly pliable non-conducting elastomers may be used for the purpose including completely cured, long-chain rubber-like hydrocarbon compounds of the requisite properties.

The inside diameter of the smaller end of the sleeve 32 when the sleeve is unrestrained or free from stress is not larger than the outside diameter of the carrier pipe 20, including the protective material on the pipe. Preferably the inside diameter of the smaller end of the sleeve is from 3 to 6% less than the outside diameter of the carrier pipe to insure a reasonably tight or snug fit on the pipe. The unrestrained or unstressed diameter of the larger end of the sleeve is not greater than the outside diameter of the casing 22 and preferably is approximately equal to the outside diameter of the casing including the coating material on the casing.

Figure 5:
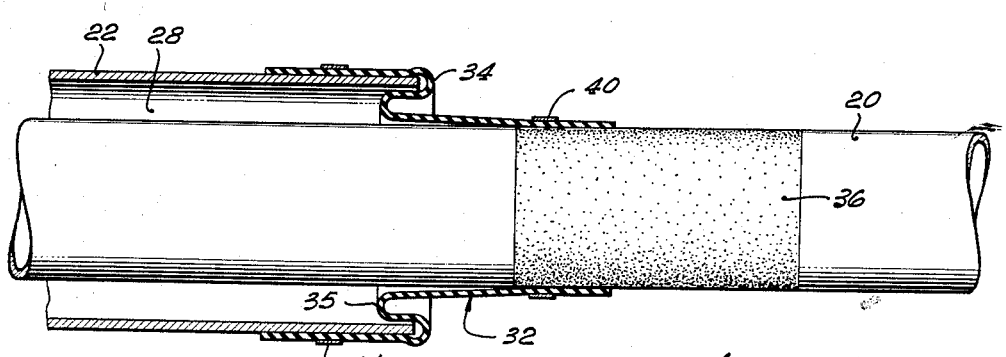
Fig. 5 is a similar sectional view showing the completely installed sleeve.

As heretofore stated, it is contemplated that the sleeve 32 when completely installed will be tucked into the annular space 28 between the carrier pipe 20 and the casing 22 in the manner shown in Fig. 5, thereby to form an outer circumferential fold 34 enclosing the rim at the end of the casing 22 and an inner circumferential fold 35 inside the annular space 28. The longitudinal portion of the sleeve 32 intermediate its two ends is of a diameter intermediate the outside diameter of the carrier pipe 20 and the outside diameter of the casing 22 to permit the sleeve to fold smoothly back on itself so that both of the folds 34 and 35 are free from wrinkles and both folds are substantially uniform around the circumference of the installed sleeve.

It is apparent that the sleeve 32 may have various configurations in various practices of the invention, so long as the larger end of the sleeve effectively embraces the end of the casing 22 and the smaller end of the sleeve effectively embraces the carrier pipe 20 with the sleeve tucked into the end of the casing to form the two folds as described. In the preferred practice of the invention the sleeve is tapered progressively from its larger end to a smaller end, the sleeve having a configuration of a truncated cone. The taper should be sufficiently gradual to form a gentle slope to the peripheral surface of the pipeline 20, and for this purpose the length of the sleeve may range between 2 and 4 times the difference between the outside diameter of the casing 22 and the outside diameter of the carrier pipe 20.

A feature of the preferred practice of the invention is the concept of using an adhesive material for the dual purpose of sealing the two ends of the sleeve 32 and of lubricating the movement of the seal along the peripheral surfaces of the carrier pipe 20 and the casing 22 to the final installed position of the sleeve. It has been found in practice that a commercial rubber cement having from 35% to 45% solids and having a relatively long open tack meets this dual requirement. By a relatively long open tack is meant that the rubber cement remains fluid and tacky for a substantial period of time, the cement being tacky preferably for 30 to 45 minutes after application.

Figure 4:
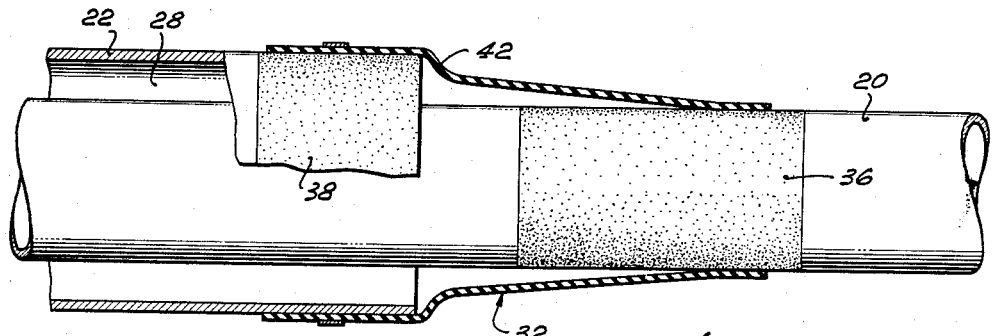
Fig. 4 is a sectional view, partly in side elevation, illustrating an intermediate stage in the procedure of installing the sealing sleeve.

In preparation for installation of the sleeve 32, a relatively wide circumferential band 36 of the rubber cement is brushed onto the carrier pipe 20 as shown in Fig. 4, and a similar circumferential band 38 of the rubber cement is brushed onto the ends of the casing 22. The sleeve 32 is then telescoped onto the carrier pipe 20 and is moved longitudinally along the carrier pipe to the position shown in Fig. 4 with the larger end of the sleeve embracing the end of the casing 22 at the cement band 38 and with the smaller end of the sleeve embracing the carrier pipe 20 at the band 36. The cement band 36 lubricates the movement of the smaller end of the sleeve along the carrier pipe and the cement band 38 lubricates the movement of the larger end of the sleeve into the desired encirclement of the end of the casing. The sleeve is preferably of such a taper and is telescoped onto the casing 22 to such degree that the rim of the casing stretches the sleeve on the order of 8 to 12 percent. The sliding movement of the smaller end of the sleeve 32 is continued toward the end of the casing 22 with the sleeve tucked into the end of the casing until the smaller end of the sleeve 32 reaches the position shown in Fig. 5 with the outer circumferential fold 34 and the inner circumferential fold 35 formed in the sleeve.

The layers 36 and 38 of rubber cement at each end of the sleeve harden to make a permanent sealing bond between the small end of the sleeve and the carrier pipe 20 and between the larger end of the sleeve and the casing 22.

While the cementitious material used for the cement bands 36 and 38 may be relied upon solely to seal the smaller end of the sleeve 32 to the carrier pipe 20 and to seal the larger end of the sleeve 32 to the casing 22, preferably means is added at the smaller end of the sleeve and again at the larger end of the sleeve to exert radially inward pressure on the sleeve. For this purpose a suitable tension member in the form of a band 40 may be placed around the smaller end of the sleeve 32 and a similar band 41 may be placed around the larger end, the two bands being manually tightened, usually by means of tools in a manner well-known in the art. In the preferred practice of the invention, the two bands 40 and 41 are made of stainless steel, but other corrision-resistant materials may be employed.

The significances of the reversed curvature of the installed configuration of the sealing sleeve 32 may be appreciated by comparing the position of the sleeve in Fig. 4 with the position in Fig. 5. In Fig. 4 the sleeve without the two folds presses radially inward against the sharp edge of the rim of the casing 22, the result being highly concentrated forces that tend to cause cold flow of the material of the sleeve with consequent thinning of the sleeve wall over a period of time. In contrast the outer fold 34 of the installed sleeve in Fig. 5 loosely encloses the sharp edges of the rim of the casing 22; in fact the wall of the sleeve actually bulges radially outward, the inner surface of the sleeve being out of contact with the casing 22 for a distance of ¼ to ½ inch back from the rim of the casing.

It is also to be noted in Fig. 4 that the steeply tapered portion 42 of the sleeve 32 immediately in front of the rim of the casing 22 is under tension throughout the thickness of the wall of the sleeve. Such tension not only creates a pronounced tendency for the material of the sleeve to cold flow, but is also detrimental to the life expectancy of the sleeve in other respects. It is well known that constantly maintained internal pressure in a material of this character accentuates the effects of aging by accelerating the dearrangement of the molecular structure of the material and thereby permitting potential cracks to form. On the contrary an internal compressive force is beneficial with respect to the effects of aging since it tends to compress the fibres to increase the density of the material and thus prevent potential cracks from forming.

In each of the two folds 34 and 35 in Fig. 5, the material of the relatively thick wall of the sleeve is largely in compression. A minor portion of the wall thickness on the outer side of each of the folds is under tension, but the major portion of the thickness of the wall at each fold is under compression. Thus, potential cracks on the outer surfaces of the two folds is of no significance in view of the fact that no cracks can form on the inner side of each fold.

Figure 2:
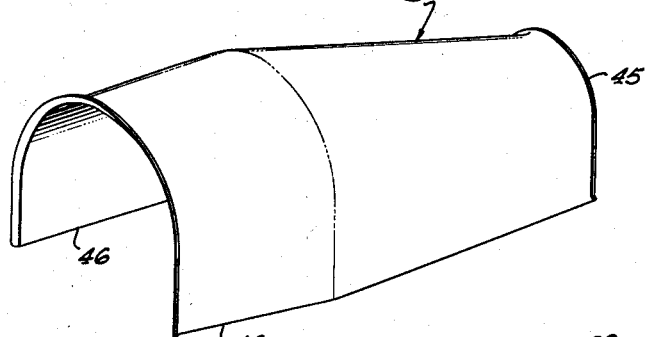
Fig. 2 is an enlarged perspective view of the shield that is used in the preferred practice of the invention.
Figure 6:
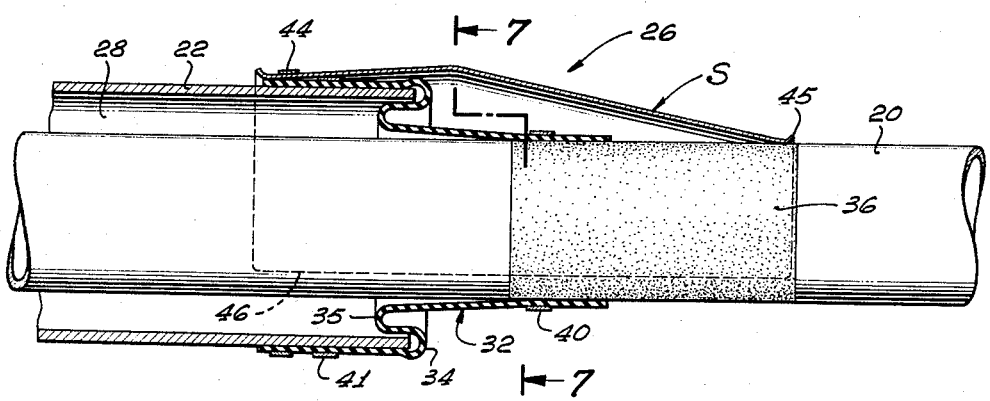
Fig. 6 is a similar view showing the addition of the shield to protect the folded sleeve.

In the preferred practice of the invention a suitable shield such as the shield generally designated S in Figs. 2 and 6 is added to protect at least the upper half of the installed sleeve 32. This shield comprises a preformed, impact-resistant, protective shell of reinforced non-conducting plastic material. The shell is sufficiently rigid to maintain its pre-formed configuration under the impact of rocks in the course of filling the pipe trench and is also sufficiently rigid to maintain its configuration under the weight of the load imposed by the soil and rocks filling the trench. Preferably the shield S covers at least the full length of the installed sleeve 32, and is sufficiently large to avoid interfering with the function of the sleeve as the sleeve adjusts itself to follow any changes in the relative positions of the pipe 20 and the casing 22.

The shield S may be made of any suitable material having the required properties. In this instance the shell is made of polyester resin reinforced by embedded material and comprises polyester-impregnated fiber glass cloth. There should be at least two layers of fiber glass and preferably more to make a total thickness of .04 to .06 inch. This thickness approximates the best balance between the opposing considerations of high structural strength and economical cost. At this thickness, the shell of the installed shield is sufficiently rigid to maintain its shape, even when subject to the impact of rocks dropped from a distance of several feet. On the other hand, this thickness provides a desirable degree of resiliency of the shield prior to installation to permit the shield to be tightened effectively against the sleeve 32.

Preferably the shield S is of a bulging configuration and of a configuration to increase its rigidity. In this instance the shield S has the general configuration of two opposed truncated conic sections to form a permanently raised cover over the double-folded sleeve 32. The shield S may have the cross sectional configuration of a complete circle, but in this instance it is only somewhat greater than a half circle in cross-sectional configuration so that the shell may protect the upper half of the sealing sleeve 32 and extend on each side somewhat more than halfway to the bottom of the sleeve.

It is contemplated that one end of the shield S will be permanently fixed relative to one end of the double-folded sleeve 32, with the other end of the shell free to shift in accord with relative longitudinal movement between the carrier pipe 20 and the casing 22. In this instance the larger end of the shield S is anchored to the larger end of the sleeve S by means of an encircling tension band 44 similar to the previously mentioned bands 40 and 41. Preferably the smaller end of the shield S is formed with a radially outwardly curved lip 45 so that the smaller end of the shield slides readily over irregularities in the surface of the carrier pipe 20.

When the assembly comprising the sleeve 32 and the shield S is completely installed as shown in Fig. 6, it is desirable to pack sand under the pipe at least to the level of the two longitudinal edges 46 of the shield S, the sand being sufficiently loose in the region of the two folds 34 and 35 to give the folds adequate freedom for movement. The trench may then be filled with rock and earth in the usual manner.

It is apparent that the double-folded sleeve 32 will maintain its sealing efficiency even though radial relative movement may occur between the carrier pipe 20 and the casing 22, and even though relative longitudinal movement may occur between the pipe and casing. Any longitudinal relative movement that occurs is accommodated almost entirely by corresponding shift of the inner fold 35 of the sleeve. In this regard an important advantage is that the inner fold 35 is completely enclosed by the casing 22. No portion of the sleeve 32 is stressed in tension to any substantial degree circumferentially. There is local longitudinal or radial tensioning in a minor portion of the thickness of the sleeve at the two folds 34 and 35, but these tension forces are more than counter balanced by greater compressor forces as heretofore explained. The neoprene of the sleeve 32 has an exceptionally long service life and, of course, the reinforced polyester shield S is practically indestructible.

Figure 8:
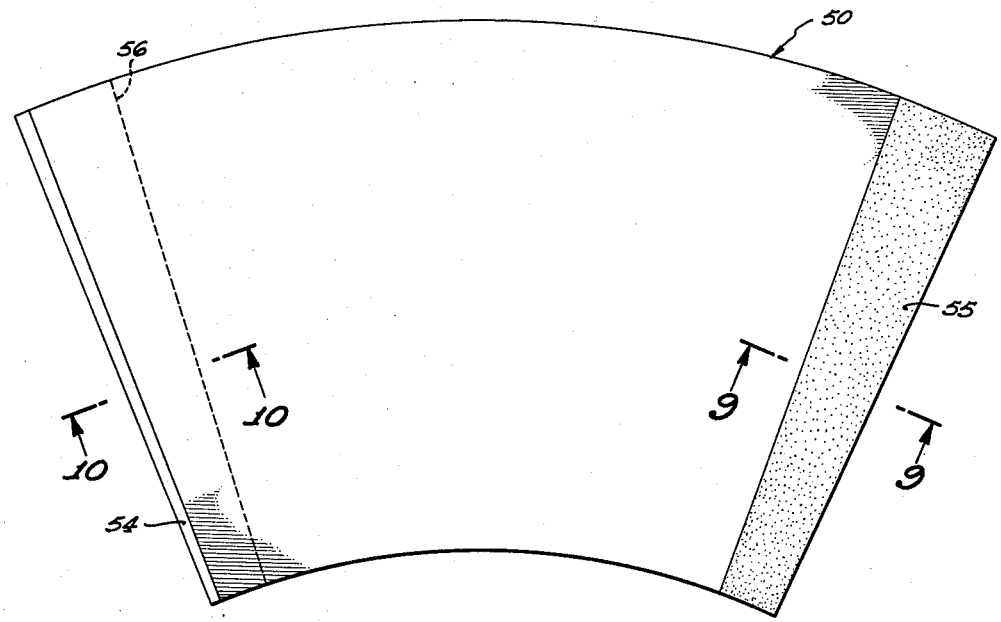
Fig. 8 is a plan view of a split sleeve that may be employed in an alternate practice of the invention, the sleeve being shown in open flat position.

Figs. 8 to 11 show a longitudinally split sleeve 50 that may be substituted for the sleeve 32 to function in the same manner for the same purpose. The split construction makes it possible for the sleeve to be opened up and moved laterally into position on a pipeline that has already been laid. The split construction also permits the sleeve to be adjusted in diameter to fit pipe and casing of various sizes and for this purpose the split sleeve is dimensioned with liberal overlapping portions that are bonded together when the sleeve is installed. As shown in Fig. 8 the sleeve 50 prior to installation is a flat piece of neoprene, and preferably the two ends have bevelled edges, one bevel 52 at one end being cut from one face of the flat sheet and the bevel 54 at the other end being cut from the opposite side.

In preparation for installation, a thin layer 55 of uncured butyl rubber is bonded by means of rubber cement to the face opposite from the bevel 52, and a similar layer 56 is bonded in the same manner to the other face at the other end of the flat sleeve so that these two layers come together and coalesce when the flat sheet is rolled into sleeve form as shown in Figs. 11 and 12. Once the sleeve is cemented in this manner, the same installation procedure is followed as heretofore described.

My description in detail of selected embodiments of the invention will suggest various changes, substitutions, and other departures from my disclosure that properly lie within the spirit and scope of the appended claims.

I claim:

1. In a subterranean transmission carrier pipe protective means, the end of a surrounding larger diameter casing, a sleeve of pliable rubber-like material of a tapered configuration, one end of said sleeve being of relatively large diameter and embracing said casing end, the other end of said sleeve being of relatively small diameter and embracing said carrier pipe at a region outside the casing and spaced away from the casing end longitudinally of the casing; the improvement comprising said sleeve having a double fold of S-shaped longitudinal cross-sectional configuration with the outer fold of the double fold encasing the end rim of the casing and with the inner fold of the double fold tucked into the interior of the casing; said outer and inner folds being loosely fitted about said casing and said pipe, respectively; and a protective shield of non-conducting material covering at least the upper circumferential portion of the sleeve in the region of said double fold to keep the weight of the earth above the sleeve from interfering with movement of said inner fold longitudinally outwardly of the casing end; said shield having a cross-sectional curvature of a relatively large radius at one end to conform to the curvature of the casing and a cross-sectional curvature of relatively small radius at the other end to conform to the curvature of the carrier pipe; said shield being tapered towards both ends from an intermediate region of maximum radius of cross-sectional curvature; said intermediate region of the shield being at a substantial radial spacing from the double fold of the sleeve to avoid interference with movement of the double fold.

2. A combination as set forth in claim 1 which includes means to anchor the larger end of the shield relative to said casing with the smaller end of the shield free to slide relative to said carrier pipe.

3. A combination as set forth in claim 2 in which said smaller end is formed with an outwardly turned lip to ride over irregularities in the surface of the carrier pipe in the sliding movement of the shield relative to the carrier pipe.

4. In a subterranean transmission carrier pipe protective means, the end of a surrounding larger diameter casing, a sleeve of pliable rubber-like material of a tapered configuration, one end of said sleeve being of relatively large diameter and embracing said casing end, the other end of said sleeve being of relatively small diameter and embracing said carrier pipe at the region outside the casing and spaced away from the casing end longitudinally of the casing; the improvement comprising said sleeve having a double fold S-shaped longitudinal cross-sectional configuration with the outer fold of the double fold encasing the end rim of the casing and with the inner fold of the double fold tucked into the interior of the casing; said outer and inner folds being loosely fitted about said casing and said pipe, respectively; and a protective shield of at least partial circumferential cross-section in planes perpendicular to the axis of said pipe, said shield covering at least the upper circumferential portion of the sleeve in the region of said double fold to keep the weight of the earth above the sleeve from interfering with movement of said inner fold longitudinally outwardly of the casing and whereby said inner fold is free to move in both longitudinal directions to accommodate thermal expansion and contraction of the pipe and casing; said shield being tapered towards both ends from an intermediate region of maximum radius of cross-sectional curvature, said intermediate region of the shield being at a substantial radial spacing from the double fold of the sleeve to avoid interference with movement of the double fold.

References Cited in the file of this patent

UNITED STATES PATENTS

| 314,089 | Westinghouse | Mar. 17, 1885 |
| 425,369 | Cowell | Apr. 8, 1890 |
| 901,339 | Grant | Oct. 20, 1908 |
| 1,528,560 | Myers | Mar. 3, 1925 |
| 1,921,709 | Stecher | Aug. 8, 1933 |
| 1,923,124 | Stanley | Aug. 22, 1933 |
| 2,014,355 | Hussman | Sept. 10, 1935 |
| 2,186,786 | Jensen | Jan. 9, 1940 |
| 2,344,238 | Finch | Mar. 14, 1944 |
| 2,415,323 | Wilcox | Feb. 4, 1947 |
| 2,440,864 | Liss | May 4, 1948 |
| 2,693,223 | Krupp | Nov. 2, 1954 |
| 2,765,182 | Williamson | Oct. 2, 1956 |
| 2,793,883 | Main | May 28, 1957 |

FOREIGN PATENTS

| 6,746 | Great Britain | Mar. 23, 1903 |